US007002699B2

(12) United States Patent
Kong et al.

(10) Patent No.: US 7,002,699 B2
(45) Date of Patent: Feb. 21, 2006

(54) IDENTIFICATION AND LABELING OF BEAM IMAGES OF A STRUCTURED BEAM MATRIX

(75) Inventors: Hongzhi Kong, Kokomo, IN (US); Qin Sun, Kokomo, IN (US); Stephen J. Kiselewich, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 153 days.

(21) Appl. No.: 10/784,648

(22) Filed: Feb. 23, 2004

(65) Prior Publication Data

US 2005/0185194 A1 Aug. 25, 2005

(51) Int. Cl.
*G01B 11/24* (2006.01)
*G01J 11/32* (2006.01)
*G01N 2/86* (2006.01)

(52) U.S. Cl. ...................... 356/614; 356/601; 356/603; 356/394; 250/559.22; 250/559.23; 250/214 AG

(58) Field of Classification Search ........ 358/601–603, 358/606–608, 614, 621–622, 392–398; 250/205, 250/222.1, 214 AG, 559.22, 559.23, 559.4; 345/7–9

See application file for complete search history.

(56) References Cited

U.S. PATENT DOCUMENTS 4,294,544 A * 10/1981 Altschuler et al. .......... 356/610
5,257,060 A * 10/1993 Kotani et al. ............... 396/109
5,886,675 A * 3/1999 Aye et al. ....................... 345/7
5,912,738 A * 6/1999 Chason et al. .............. 356/601
6,310,358 B1 * 10/2001 Zur ............................ 250/591
6,377,353 B1 * 4/2002 Ellis ........................... 356/603
6,762,427 B1 * 7/2004 Kong et al. ............ 250/559.22

* cited by examiner

*Primary Examiner*—Gregory J. Toatley, Jr.
*Assistant Examiner*—Sang H. Nguyen
(74) *Attorney, Agent, or Firm*—Stefan V. Chmielewski

(57) ABSTRACT

A technique for identifying beam images of a beam matrix includes a number of steps. Initially, a plurality of light beams of a beam matrix, which are arranged in rows and columns, are received after reflection from a surface of a target. Next, a reference light beam is located in the beam matrix. Then, a row pivot beam is located in the beam matrix based on the reference beam. Next, remaining reference row beams of a reference row that includes the row pivot beam and the reference beam are located. Then, a column pivot beam in the beam matrix is located based on the reference beam. Next, remaining reference column beams of a reference column that includes the column pivot beam and the reference beam are located. Finally, remaining ones of the light beams in the beam matrix are located.

21 Claims, 11 Drawing Sheets

IDENTIFICATION AND LABELING OF BEAM IMAGES OF A STRUCTURED BEAM MATRIX

TECHNICAL FIELD

The present invention is generally directed to identification and labeling of beam images and, more specifically, to identification and labeling of beam images of a structured beam matrix.

BACKGROUND OF THE INVENTION

Some vision systems have implemented dual stereo cameras to perform optical triangulation ranging. However, such dual stereo camera systems tend to be slow for real time applications and expensive and have poor distance measurement accuracy, when an object to be ranged lacks surface texture. Other vision systems have implemented a single camera and temporally encoded probing beams for triangulation ranging. In those systems, the probing beams are sequentially directed to different parts of the object through beam scanning or control of light source arrays. However, such systems are generally not suitable for high volume production and/or are limited in spatial resolution. In general, as such systems measure distance one point at a time, fast two-dimensional (2D) ranging cannot be achieved unless an expensive high-speed camera system is used.

A primary difficulty with using a single camera and simultaneously projected probing beams for triangulation is distinguishing each individual beam image from the rest of the beam images in the image plane. It is desirable to be able to distinguish each individual beam image as the target distance is measured through the correlation between the distance of the target upon which the beam is projected and the location of the returned beam image in the image plane. As such, when multiple beam images are simultaneously projected, one particular location on the image plane may be correlated with several beam images with different target distances. In order to measure the distance correctly, each beam image must be labeled without ambiguity.

In occupant protection systems that utilize a single camera in conjunction with a near IR light projector, to obtain both the image and the range information of an occupant of a motor vehicle, it is highly desirable to be able to accurately distinguish each individual beam image. In a typical occupant protection system, the near IR light projector emits a structured dot-beam matrix in the camera's field of view for range measurement. Using spatial encoding and triangulation methods, the object ranges covered by the dot-beam matrix can be detected simultaneously by the system. However, for proper range measurement, the system must first establish the relationship between the target range probed by each beam and its image location through calibration. Since this relationship is generally unique for each of the beams, while multiple beams are present simultaneously in the image plane, it is desirable to accurately locate and label each of the beams in the matrix.

Various approaches have been implemented or contemplated to accurately locate and label beams of a beam matrix. For example, manually labeling and locating the beams has been employed during calibration. However, manual locating and labeling beams is typically impractical in high volume production environments and is also error prone.

Another beam locating and labeling approach is based on the assumption that valid beams in a beam matrix are always brighter than those beams outside the matrix and the entire beam matrix is present in the image. This assumption creates strong limitations on a beam matrix projector and the sensing range of the system. Due to the imperfection of most projectors, it has been observed that some image noises can be locally brighter than some true beams. Further, desired sensing ranges for many applications result in partial images of the beam matrix being available.

What is needed is a technique that locates and labels beams of a beam matrix that is readily implemented in high-production environments.

SUMMARY OF THE INVENTION

The present invention is directed to a technique for identifying beam images of a beam matrix. Initially, a plurality of light beams of a beam matrix, which are arranged in rows and columns, are received after reflection from a surface of a target. Next, a reference light beam is located in the beam matrix. Then, a row pivot beam is located in the beam matrix based on the reference beam. Next, remaining reference row beams of a reference row that includes the row pivot beam and the reference beam are located. Then, a column pivot beam in the beam matrix is located based on the reference beam. Next, remaining reference column beams of a reference column, that includes the column pivot beam and the reference beam, are located. Finally, remaining ones of the light beams in the beam matrix are located.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

According to the present invention, a technique is disclosed that applies a set of constraints and thresholds to locate a reference beam around the middle of a beam matrix.

Adjacent to this reference beam, two more beams are located to establish the local structure of the matrix. Using this structure and local updates, the technique identifies valid beams to the matrix boundary. In particular, invariant spatial distribution of the matrix in the image plane and smoothness of energy distribution of valid beams are used to locate each beam and the boundaries of the matrix. The technique exhibits significant tolerance to system variation, image noise and irregularity matrix. The technique is also valid for distorted and partial matrix images. The robustness and speed of the technique provides for on-line calibration in volume production. As is disclosed herein, the technique has been effectively demonstrated with a 7 by 15 beam matrix and a single camera.

Figure 1:
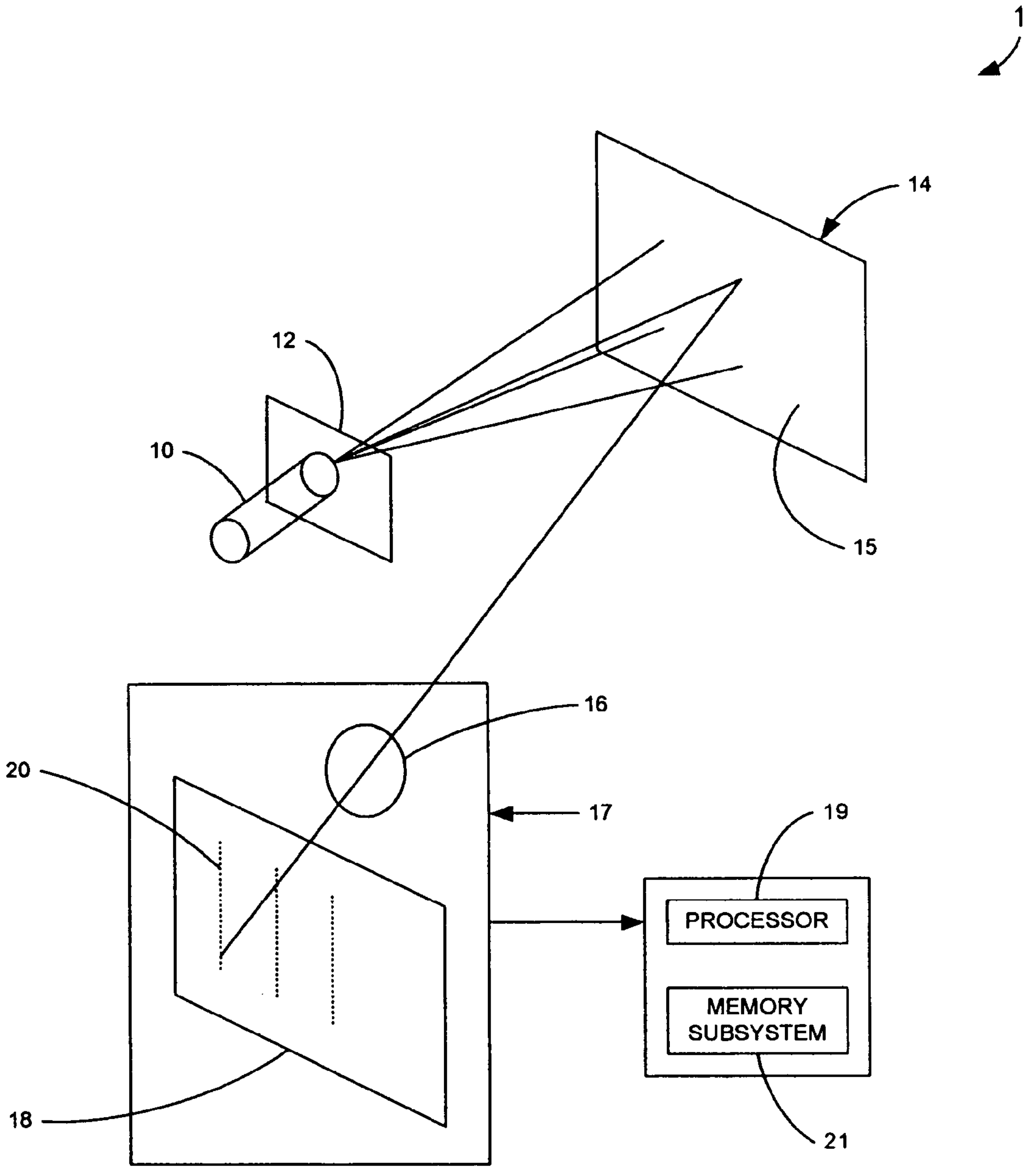
FIG. 1 is a block diagram of an exemplary object surface sensing system.

With reference to FIG. 1, an optical surface configuration system 1 is depicted. The system 1 includes a laser or similar source of electromagnetic radiation 10 that directs an optical beam to an optical diffraction grating 12, which splits the beam into a plurality of beams, producing a rectangular grid pattern on a surface 15 of a target 14. The beams are reflected from the surface 15 of the target 14 and a camera 17 is positioned to receive the reflected beams. A lens 16 of the camera 17 focuses the received beams onto an image surface 18, which provides an image plane 20. A processor 19 having a memory subsystem 21 is provided to process the images formed in the image plane 20.

Figure 2A:
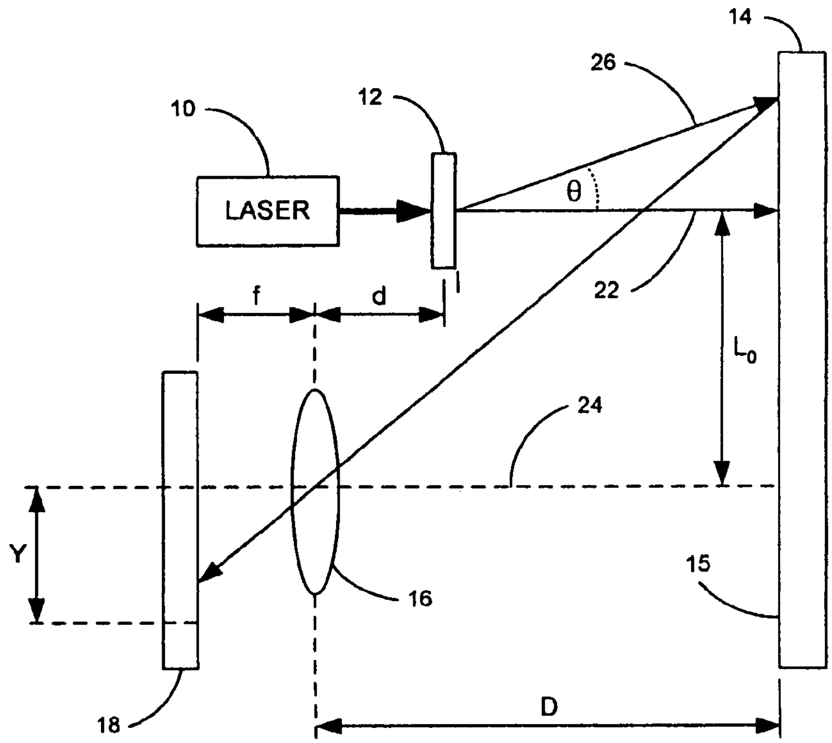
FIGS. 2A and 2B are diagrams showing vertical and horizontal triangulation relationships, respectively, for the system of FIG. 1.

With reference to FIG. 2A, the target 14 is shown having a surface 15 in an x-y plane at distance 'D' in the z direction from the lens 16, where the x direction is perpendicular to the page and the z and y directions are horizontal and vertical, respectively, on the page. The grating 12 is closer than the lens 16 to the surface 15 in the z direction by a distance 'd' and the image surface 18 is a distance 'f' from lens 16 in the opposite z direction. A center 22 of the grating 12 is a distance $L_0$ from the lens axis 24 in the y direction. A beam 26 is directed by grating 12 at an angle θ from the horizontal z axis to strike the surface 15 of the target 14 and is reflected back through the lens 16 of the camera 17 to strike the image plane 20 of the camera 17 a distance Y from the lens axis 24. Vertical triangulation is based on a mathematically derived relationship expressed in the following equation:

$$Y=\{f^*[L_0+(D-d)\tan\theta)]\}/D$$

For a given target distance, the preceding equation uniquely defines an image location Y in the image plane. Thus, the target distance may be derived from the image location in the following equation if d is chosen to be zero (the diffraction grating is placed in the same plane as the camera lens):

$$Y=f^*[L_0/D+\tan\theta]$$

Figure 2B:
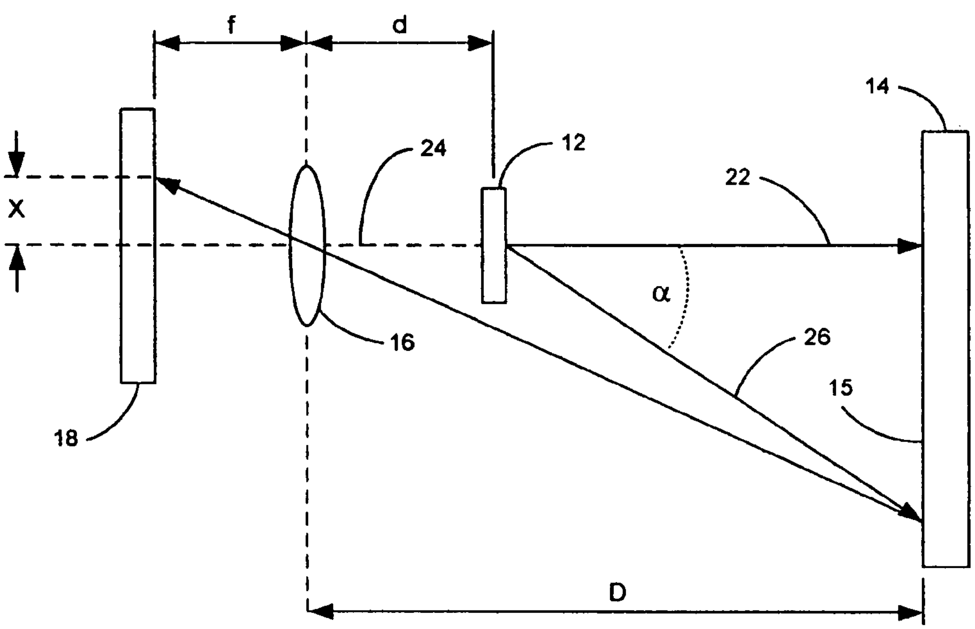

When two dimensional probing beams are involved, horizontal triangulation is generally also employed. A horizontal triangulation arrangement is shown in FIG. 2B, with α being the diffracted beam angle and the image location in the image plane corresponding to X. The mathematical relationship is expressed in the following equation:

$$X=f^*(\tan\alpha(1-d/D))$$

Since the beams have different horizontal diffraction angles α, the spatial separation between the beams on the image plane will be non-uniform as 'D' varies. However, if 'd' is made zero (the diffraction grating is placed in the same plane as the camera lens), the dependence will disappear. In the latter case, the distance X may be derived from the following equation:

$$X=f^*\tan\alpha$$

It should be appreciated that an optical configuration may be chosen as described above with the optical grating 12 placed in the same plane as the lens 16 of the camera 17. In this manner, the horizontal triangulation, which may cause difficulties for spatial encoding, can be eliminated. In a system employing such a scheme, larger beam densities, larger fields of view and larger sensing ranges for simultaneous multiple beam ranging with a single camera and two dimensional (2D) probing beams can be achieved. Thus, it should be appreciated that the system 1 described above allows a two dimensional (2D) array of beams to be generated by the optical grating 12 to comprise a first predetermined number of rows of beams, each row containing a second number of individual beams. Each of the beams, when reflected from the surface 15 of the target 14, forms a beam image in the image surface 18. The beam paths of all the beam images are straight generally parallel lines and readily allow for optical object-to-surface characterization using optical triangulation in a single camera.

Figure 3A:
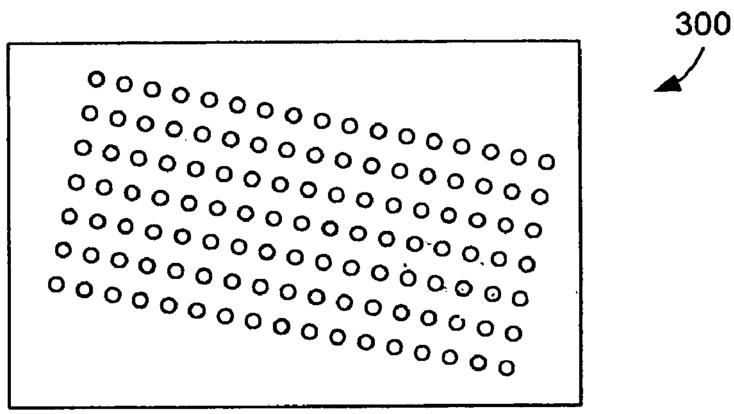
FIGS. 3A–3C are diagrams of a 7 by 15 beam matrix images at close, middle and far target ranges, respectively.
Figure 3B:
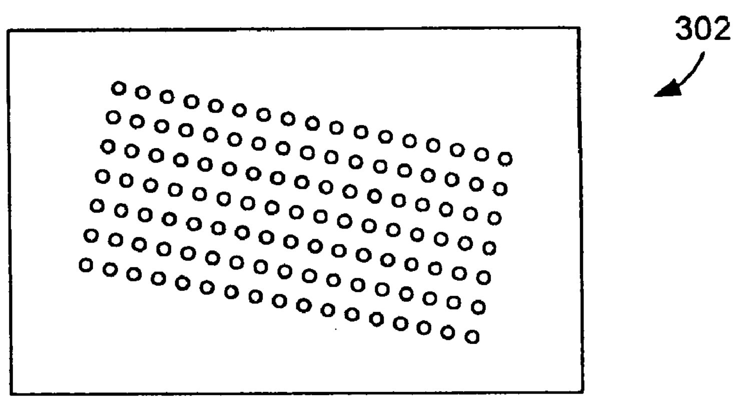
Figure 3C:
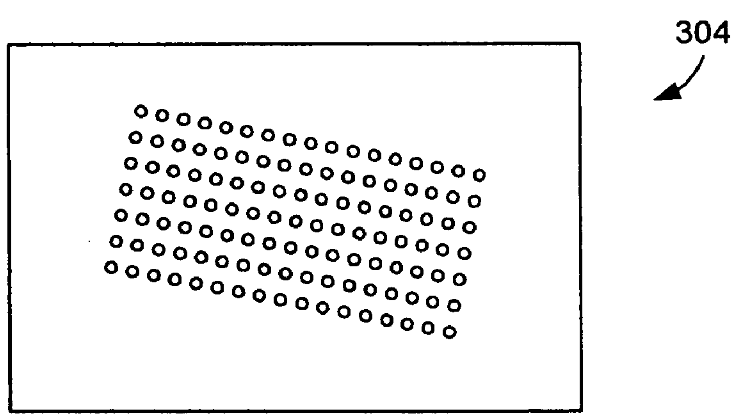

During system calibration, a flat target with a substantially uniform reflectivity is positioned at a distance from the camera system. For a vertical epipolar system (the alignment of the light projector with camera relative to the image frame), the matrix image shifts up and down as target distance varies. As examples, typical matrix images 300, 302 and 304 (at close, middle and far ranges) for the system of FIG. 1 are shown in FIGS. 3A–3C, respectively. As is shown in FIGS. 3A–3C, optical noise, distortion, non-uniform beam intensity and partial images of the matrix are typical. A goal of an algorithm that implements the present invention is to locate and label each of the beams accurately and consistently.

The algorithm assumes that the beam matrix is approximately periodic and the number of beams in its row and column is known, i.e., N(row) by M(column) in rectangular shape. The algorithm also assumes that inter-beam spacing in the matrix is approximately invariant in the image plane. This condition can be satisfied as long as the beam matrix is projected from a point source onto a flat target. In this case, each beam is projected from this point to a different angle that is matched by camera optics. In this manner, the spatial separation between any two beams in the image plane becomes independent of target distance.

The algorithm also assumes that the nominal inter-beam spacing (between rows and columns) and matrix orientation are known, i.e., center-to-center column distance=$a_0$ (same row), center-to-center row distance=$b_0$ (same column); orientation given by angle=$\theta_0$ rotated clockwise from the horizontal direction in the image plane. Additionally, the algorithm assumes that at least three of the four boundaries of the matrix are present in the image. In the examples described hereafter, it is desirable for the left and right and at least one of the top or bottom boundaries of the beam matrix to be within the image frame. The matrix image is approximately centered in the horizontal direction of the image and moves up and down as the target distance varies (vertical epipolar system). Finally, as a reference, the image pixel coordinate is indicated with x (horizontal) and y (vertical), respectively, with the adjusted origin of the coordinate (0,0) being located at the top left corner of the image.

An algorithm incorporating the present invention performs a number of steps, which seek to locate and label the beams of a beam matrix, which are further described below.

1. Locate a Reference Beam in the Beam Matrix.

Figure 4:
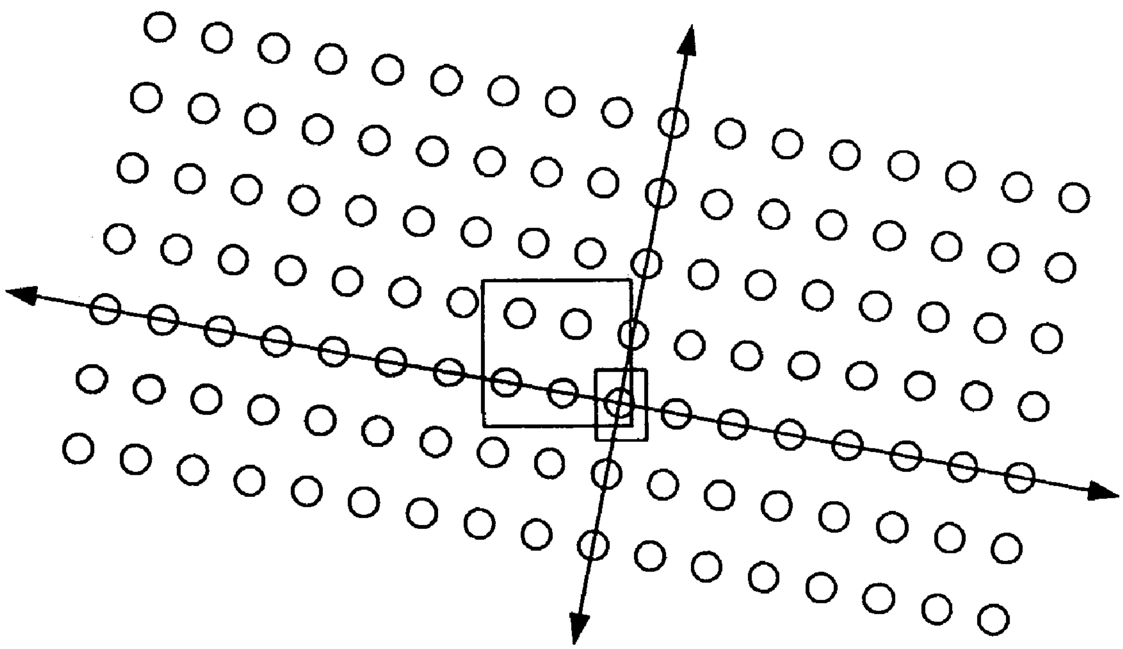
FIG. 4 is a diagram depicting the location of a reference beam in a beam matrix image.

A first beam found in the matrix is referred to herein as a reference beam. The starting point in searching for the reference beam is given by location $(x_i,y_i)$ where $x_i$ is the middle horizontal point of the image frame in the horizontal direction and a middle vertical point $y_i$ is defined by the possible vertical boundaries of the matrix (see FIG. 4). By using a pre-determined beam size threshold, the first beam that is larger than this threshold from the top at $y_{top}$ and the first beam from the bottom at $y_{bot}$ are located and $y_i$ is determined from the average of the difference $(y_{bot}-y_{top})/2$. Such an arrangement ensures that the starting point is most likely in the middle area of the beam matrix with minimized searching overhead.

Centered at $(x_i,x_iy_i)$, the reference beam is searched in a $2a_0 \cos \theta_0 * 2b_0 \cos \theta_0$ rectangular-shaped window. This window size is selected to ensure that at least one true beam is included, while minimizing the search area. Since multiple beams may be included in the window, only one beam is selected that has the maximum one-dimensional energy (sum of consecutive non-zero pixel values in horizontal and/or vertical direction). In this implementation, the horizontal dimension (x) is used. For the selected beam, its center of gravity Cg(x) in horizontal direction is calculated. Passing through the center of gravity Cg(x), the vertical center of gravity Cg(y) of this beam is further calculated.

It should be appreciated that it is still possible that the boundary of this selected beam may be limited by the boundary of the searching window. In order to accurately locate the reference beam, a smaller window centered at (Cg(x), Cg(y)) may be set to include and isolate the complete target beam. This window is an isolated searching window and is rectangular shaped with size $a_0 \cos \theta_0 * b_0 \cos \theta_0$. Within this isolated searching window, the maximum energy beam is selected and its center of gravity $(Cg(x_{00}), Cg(y_{00}))$ is calculated and the beam is labelled as Beam (0,0). The initial beam labels may be relative to the reference beam. For example, a beam label Beam(n,m) indicates the beam at the $n^{th}$ row and $m^{th}$ column from the reference beam. The sign of the n and m indicates the beam at the right (m>0), left (m<0), top (n<0) or bottom (n>0) of the reference beam. The true label of the beams is updated at a later point using the upper left corner of the matrix.

2. Find the Row Pivot Beam from the Reference Beam.

Figure 5:
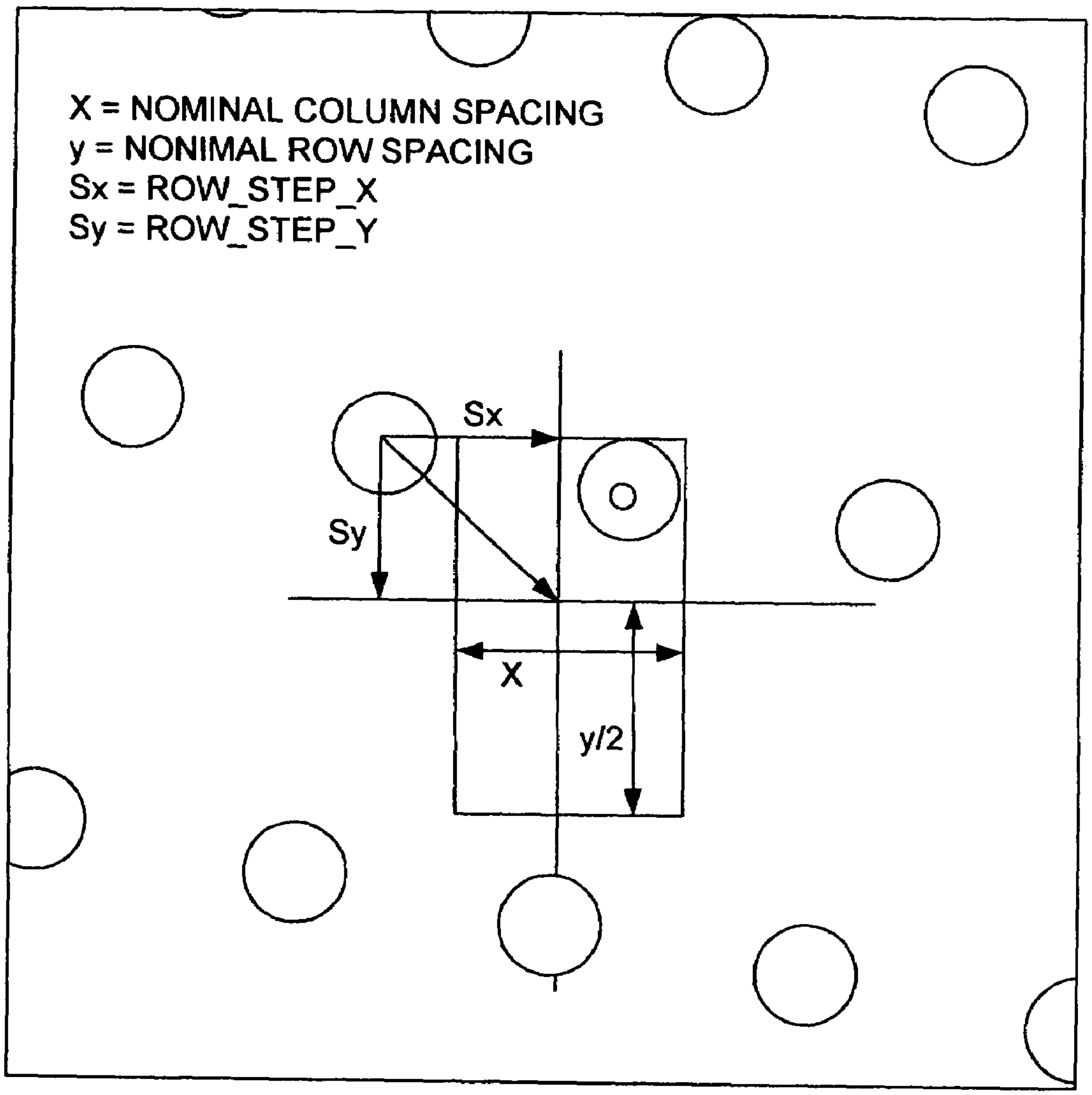
FIG. 5 is a diagram depicting the location of a row pivot beam in a beam matrix image.

Next, the same-row beam on the right side of the reference beam, i.e., a row pivot beam with label Beam(0,1), is located. Invariant spatial constraint of the matrix in the image plane is applied and the nominal inter-beam column spacing and orientation is used initially (see FIG. 5). From the reference beam, the center of the isolated searching window is moved to the nominal center of Beam(0,1) at location $(x_{01},y_{01})$:

$$x_{01}=Cg(x_{00})+a_0 \cos \theta_0$$

$$y_{01}=Cg(y_{00})+a_0 \sin \theta_0$$

Figure 6:
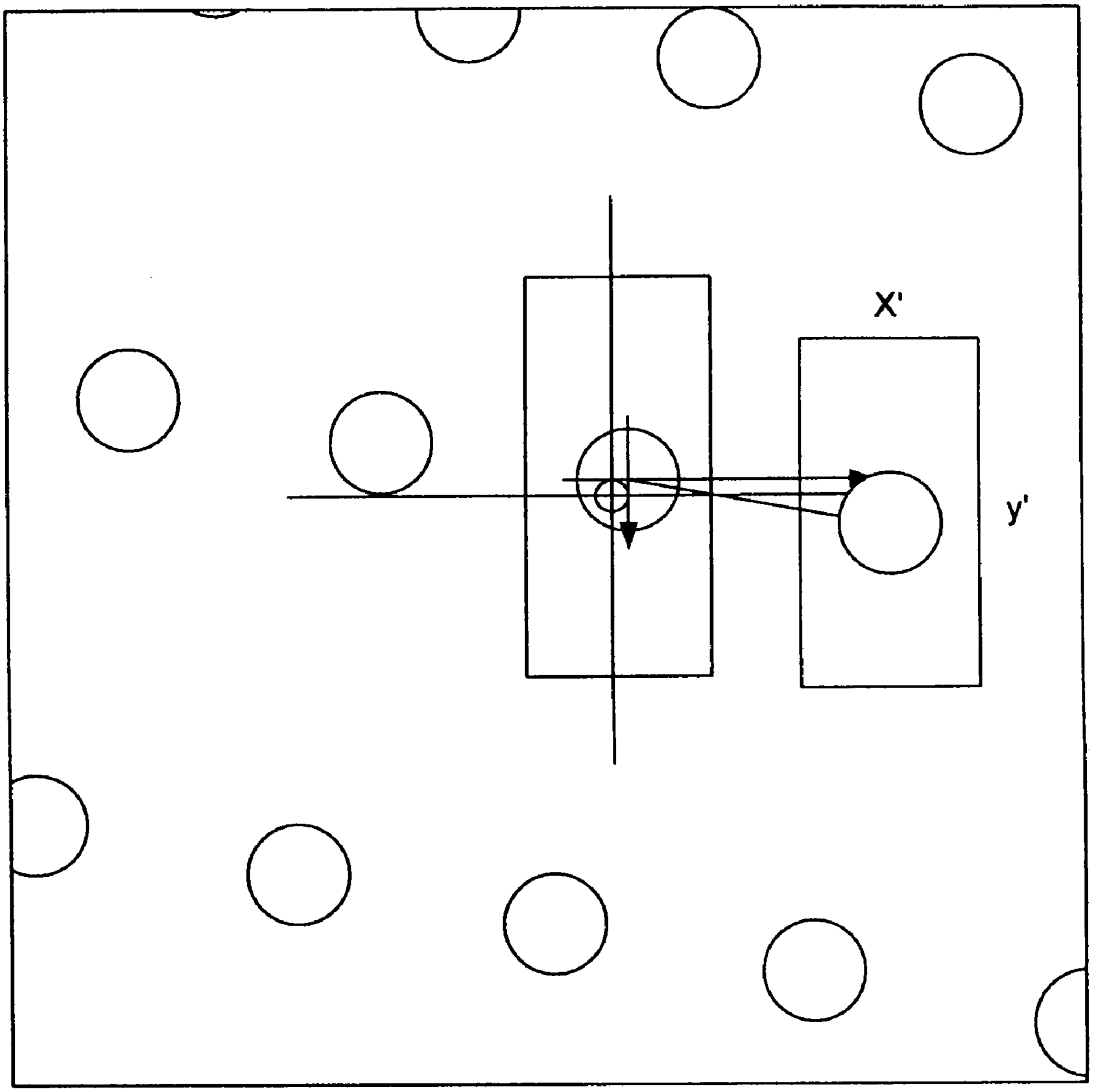
FIG. 6 is a diagram depicting the determination of the center of gravity of the row pivot beam in a realigned isolated search window.

The $a_0 \cos \theta_0$ and $a_0 \sin \theta_0$ are referred to herein as row_step_x and row step y values, respectively. Within the window, one beam is selected according to its one-dimensional (x) maximum beam energy. Then the initial center of gravity of this selected beam is calculated. Due to the fact that the nominal beam spacing and matrix orientation have been used, it is possible that the isolated searching window may not include the complete target beam. To increase the system robustness and accuracy, the isolated searching window is re-aligned to the initial center of gravity location (see FIG. 6). The true center of gravity $(Cg(x_{01}),Cg(y_{01}))$ associated with Beam(0,1) is then recalculated. With the locations of the reference beam and the row pivot beam, the local row_step_x and row_step y values are updated as:

$$\text{row\_step\_}x=Cg(x_{01})-Cg(x_{00})$$

$$\text{row\_step\_}y=Cg(y_{01})-Cg(y_{00})$$

The local matrix orientation is also updated as:

$$\theta = \tan^{-1}\left(\frac{Cg(y_{01}) - Cg(y_{00})}{Cg(x_{01}) - Cg(x_{00})}\right)$$

3. Locate the Remaining Beams in the Row that Includes the Reference and the Row Pivot Beams.

Since the relative positions of nearby beams should be similar (smoothness constraint), the next beam location is predicted from its neighboring beam parameters. Using local row step_x and row_step_y values from the previous step, the isolated searching window is moved to the next test point to locate and calculate the center of gravity of the target beam. It should be noted that the final beam location (center of gravity) is typically different from the initial test point. In order to increase noise immunity, this difference is used to correct the local matrix structure for the next step. This process is repeated until no valid beam is found (using beam size threshold) or the frame boundary is reached.

For example, to find Beam(0,n+1) (to the right of the reference beam) the isolated window is moved to the test point $(x_{0(n+1)},y_{0(n+1)})$ from Beam(0,n) at $(Cg(x_{0n}), Cg(y_{0n}))$:

$$x_{0(n+1)}=Cg(x_{0n})+\text{row\_step\_}x(n+1)$$

$$y_{0(n+1)}=Cg(y_{0n})+\text{row\_step\_}y(n+1)$$

$$\text{row\_step\_}x(n+1)=\text{row\_step\_}x(n)+[Cg(x_{0n})-x_{0(n)}]/C$$

$$\text{row\_step\_}y(n+1)=\text{row\_step\_}y(n)+[Cg(y_{0n})-y_{0(n)}]/C$$

where n=1,2, . . . ,$Cg(x_{0n})$ and $Cg(y_{0n})$ is the center of gravity of Beam(0,n) in x and y directions, and C>=1 is a correction factor. The choice of C determines the weighting of history (last step) and the presence (current center of gravity). When C=1, for example, the next row steps will be completely updated with the current center of gravity.

In a similar manner, the Beam(0,−n) to the left of the reference beam is found. The isolated window is then moved to the test point $(x_{0(-n)}, y_{0(-n)})$:

$$x_{0(-n)}=Cg(x_{0(1-n)})+\text{row\_step\_}x(-n)$$

$$y_{0(-n)}=Cg(y_{0(1-n)})+\text{row\_}_{step}\text{\_}y(-n)$$

$$\text{row\_step\_}x(-n)=\text{row\_step\_}x(-n+1)+[Cg(x_{0(1-n)})-x_{0(1-n)})]/C$$

$$\text{row\_step\_}y(-n)=\text{row\_step\_}y(-n+1)+[Cg(y_{0(1-n)})-y_{0(1-n)})]/C$$

4. Find the Column Pivot Beam from the Reference Beam.

Then, the next same-column beam on the topside of the reference beam, i.e., a column pivot beam with label Beam (−1,0), is located. The nominal row distance $b_0$ and the updated local matrix orientation are used to move the isolated searching window to the predicted location ($x_{(-1)0}$, $y_{(-1)0}$) for Beam(−1,0):

$$x_{(-1)0}=Cg(x_{00})+b_0 \sin\theta$$

$$y_{(-1)0}=Cg(y_{00})+b_0 \cos\theta$$

The values $b_0 \sin\theta$ and $b_0 \cos\theta$ are referred to herein as column_step_x and column_step_y, respectively. The calculation of the center of gravity ($Cg(x_{(-1)0})$,$Cg(y_{(-1)0})$) is similar to that described for the row pivot beam. With the locations of the reference beam and the column pivot beam, the local column_step_x and column_step_y are updated as:

$$\text{column\_step\_}x=Cg(x_{(-1)0})-Cg(x_{00})$$

$$\text{column\_step\_}y=Cg(y_{(-1)0})-Cg(y_{00})$$

5. Locate the Remaining Beams in the Column that Include the Reference and the Column Pivot Beams.

Starting from the reference beam or column pivot beams, the isolated searching window is moved down or up to the next neighboring beam using the updated column_step_x and column_step_y to the next neighboring beam. Similar to searching in rows, once the center of gravity of this new beam is located, the local column_step_x and column_step_y is updated for the next step. This process is repeated until no valid beam can be found or the image frame boundary is reached.

6. Locate the Rest Beams in the Matrix.

At this point, one row and one column crossing through the reference beam in the matrix has been located and labeled. Locating and labeling the rest of the beams can be carried out row-by-row, column-by-column or by a combination of the two. Since the process relies on the updated local matrix structure, the sequence of locating the next beam is always outward from the labeled beams. For example, the next row above the reference beam can be labelled by moving the isolated searching window from known Beam(−1,0) to next Beam(−1,1). Its row_step_x and row_step_y values should be the same as that of its local steps already updated by Beam(0,0) and Beam(0,1). Once the Beam(−1,1) is located, the new row_step_x and row_step_y values are updated using the relative location of Beam(−1,1) and Beam(−1,0). The process is repeated until all the valid beams in the row are located. Similarly, the beams in the next row are located until reaching the frame boundary or no beams are found.

7. Determine the True Matrix Boundaries.

The beams located to this point may include "false beams" that correspond to noise in the image. This is particularly true for a beam matrix that is created from a diffraction grating. In this case, higher order diffractions cause residual beams that are outside of the intended matrix but have similar periodic structures. In order to determine the true matrix boundaries, energy discrimination and matrix structure constraints may be employed.

Since both of the column boundaries are present in the image, the total number of beams in one complete row must be equal to M for an N by M matrix. However, since the matrix can be rotated relative to the image frame, exceptions may occur when an incomplete row is terminated by the top or bottom boundary of the image. As such, those rows are not used in determining the column boundaries. Further, the rows that are not terminated by the frame boundaries but with beams less than M are discarded as noise. For any normally terminated row, if the total number of beams is larger than M, the additional beams are dropped one at a time from the most outside beams in the row using the fact that the noise energy should be significantly less than that of a true beam. The less energy beam between the beams at both ends of the row is dropped first. This process is repeated until M beams remain in the row. In order to eliminate possible singularities, a majority vote from each row is used to decide the final column boundaries. If there are rows that are inconsistent with the majority vote, their boundaries are adjusted to be compliant.

The row boundaries of the matrix are determined in two different cases. If both boundaries are not terminated by image frame boundaries, the similar process described above for the column boundaries is used except that the known number of rows in the matrix is N. If one of the row boundaries is terminated by the frame boundary, the remaining number of rows in the image becomes uncertain. It is assumed that the energy variations between adjacent beams within the true matrix should be much smoother than that at the matrix boundaries. This energy similarity constraint among valid beams is applied in finding the row boundaries. Within the already defined column boundaries, the average beam energy for each row is calculated. Starting from the row that includes the reference beam outwards, the percentage change of energy between the adjacent rows is calculated. When the change is a decrease and larger than a predetermined threshold, the boundary is determined at the transition.

If the remaining number of rows is less than N for the N by M matrix, the beams in the rows that are terminated by frame boundaries are retained and labelled, within the limit of N beams in the column.

8. Label the Final Matrix with Boundary Conventions.

For consistent labels with different frames, the relative labels with the reference beam are converted to a conventional matrix labels. The top left corner beam is labelled as Beam(1,1), the top right corner beam as Beam(1,M), the left bottom beam as Beam(N, 1) and the right bottom beam as Beam(N,M). The conversion is carried out with known matrix boundaries and the relative labels.

While the algorithm has been implemented and demonstrated with a 7 by 15 beam matrix, it should be appreciated that the techniques described herein are applicable to beam matrices of different dimensions. Further, while the light projector has been described as consisting of a pulsed laser and a diffraction grating that splits the input laser beam into the matrix, other apparatus may be utilized within the scope of the invention. In any case, a VGA resolution camera aligned vertically with the projector may capture the image of the matrix on a flat target. In such a system, it is desirable to synchronize the laser light with the camera so that the images with and without the projected light can be captured alternately. Using the differential image from the alternated frames, the beam matrix may then be extracted from the background. The differential images are then used to locate and label the beams as described above. Flow charts for implementing the above describe technique are set forth in FIGS. 7–11, which are further described below.

Figure 7:
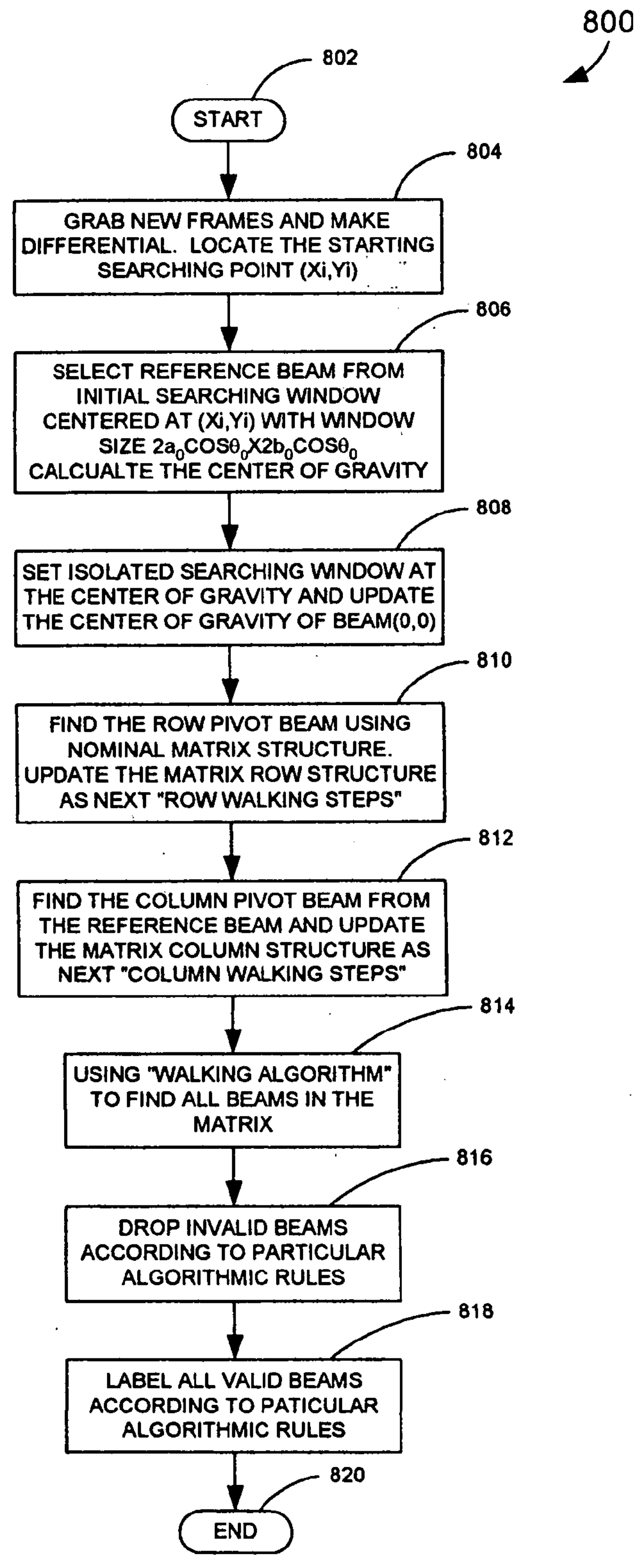
FIG. 7 is a flow diagram depicting a main program structure for locating and labeling beams in a beam matrix image.

With reference to FIG. 7, a flow chart of a routine 800 that locates valid beams of a beam matrix is further depicted. In step 802, the routine 800 is initiated, at which point control transfers to step 804, where new image frames are captured using a differential approach and an initial search point ($x_i$, $y_i$) is located. Next, in step 806, a reference beam is selected from an initial search window centered at the searching point and utilizing a window size $2a_0 \cos\theta_0 * 2b_0 \cos\theta_0$. Then, in step 808, an isolated searching window is set at the center of gravity of the reference beam and the center of gravity of the reference Beam(0,0) is updated. Next, in step 810, a row pivot beam is found using the nominal matrix structure and the matrix row structure is updated using a next row walking step. Then, in step 812, a column pivot beam is found from the reference beam and the matrix column structure is updated as a next column using next column walking steps. Next, in step 814, a walking algorithm is used to find all the beams in the matrix. Then, in step 816, the invalid beams are dropped, as is disclosed herein. Then, in step 818, all valid beams are labelled and, finally, in step 820, the routine 800 terminates.

Figure 8:
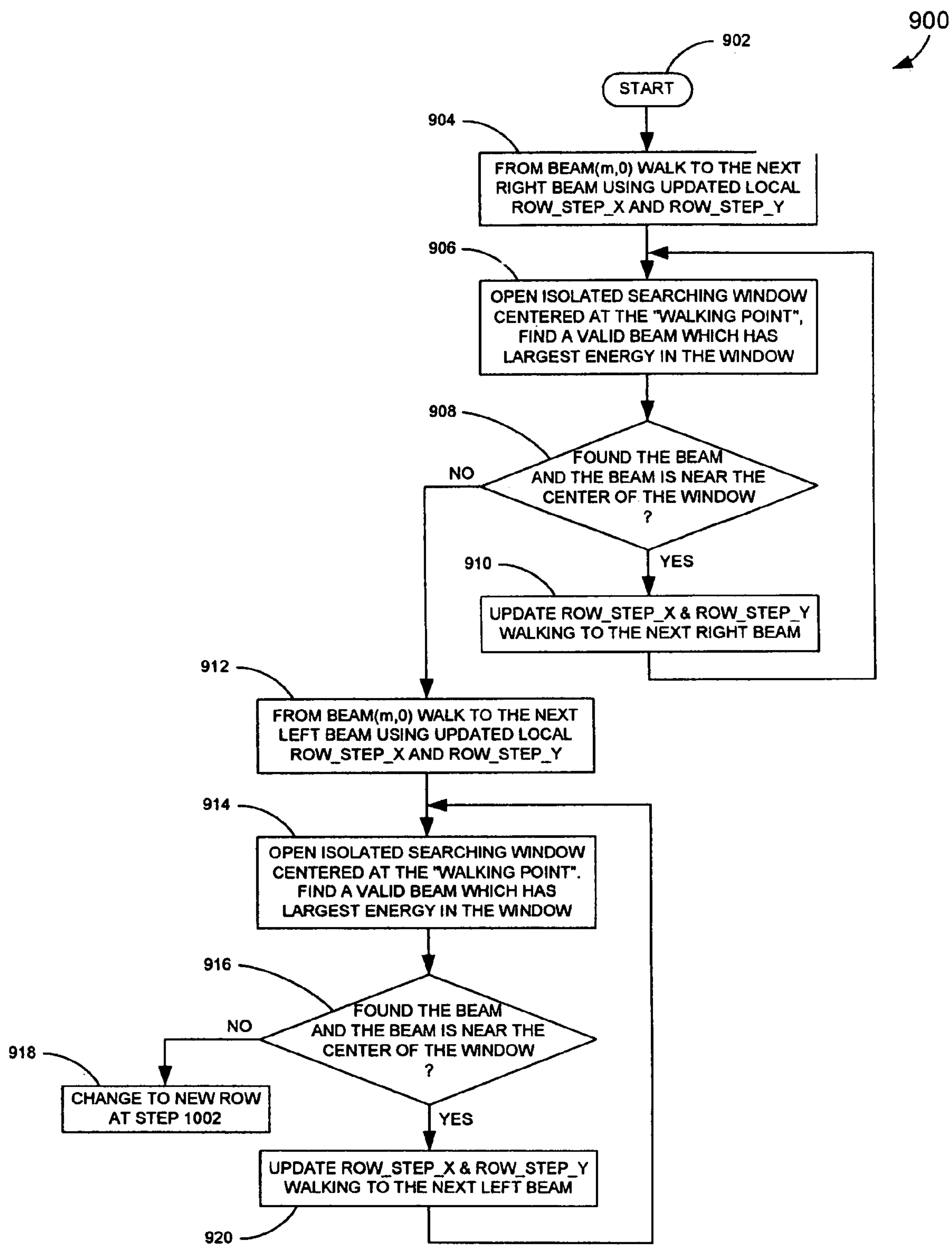
FIG. 8 is a flow diagram depicting a routine for locating and labeling beams in a row.

With reference to FIG. 8, a flow chart of a routine 900 is illustrated that discloses a technique for locating beams in a row. In step 902, the routine 900 is initiated, at which point control transfers to step 904, where the routine 900 walks from Beam(m,0) to the next right beam using an updated local row_step_x and row_step_y values. Next, in step 906, an isolated searching window, centered at the walking point, is opened and a valid beam with the highest energy in the window is located. Then, in decision step 908, the routine 900 attempts to find a beam that is located at near the center of the window. If a beam is located and it is near the center of the window (judged with a pre-determined threshold), control transfers from step 908 to step 910, where the routine 900 updates the row_step_x and row_step_y values before walking to the next right beam and transferring control to step 906. Otherwise, if the beam is not near the center of the window in step 908, control transfers to step 912, where the routine 900 walks from Beam(m,0) to the next left beam using the updated local row_step_x and row_step_y values. Next, in step 914, an isolated searching window, centered at the walking point, is opened and a valid beam that has the largest energy in the window is located. Next, in decision step 916, it is determined whether a beam is found near the center of the window. If so, control passes to step 918, where the routine 900 implements subroutine 1000 to change to a new row (see FIG. 9). If a beam is not found near the center of the window in step 916, control passes to step 920, where row_step_x and row_step_y values are updated before walking to the next left beam, before control returns to step 914.

Figure 9:
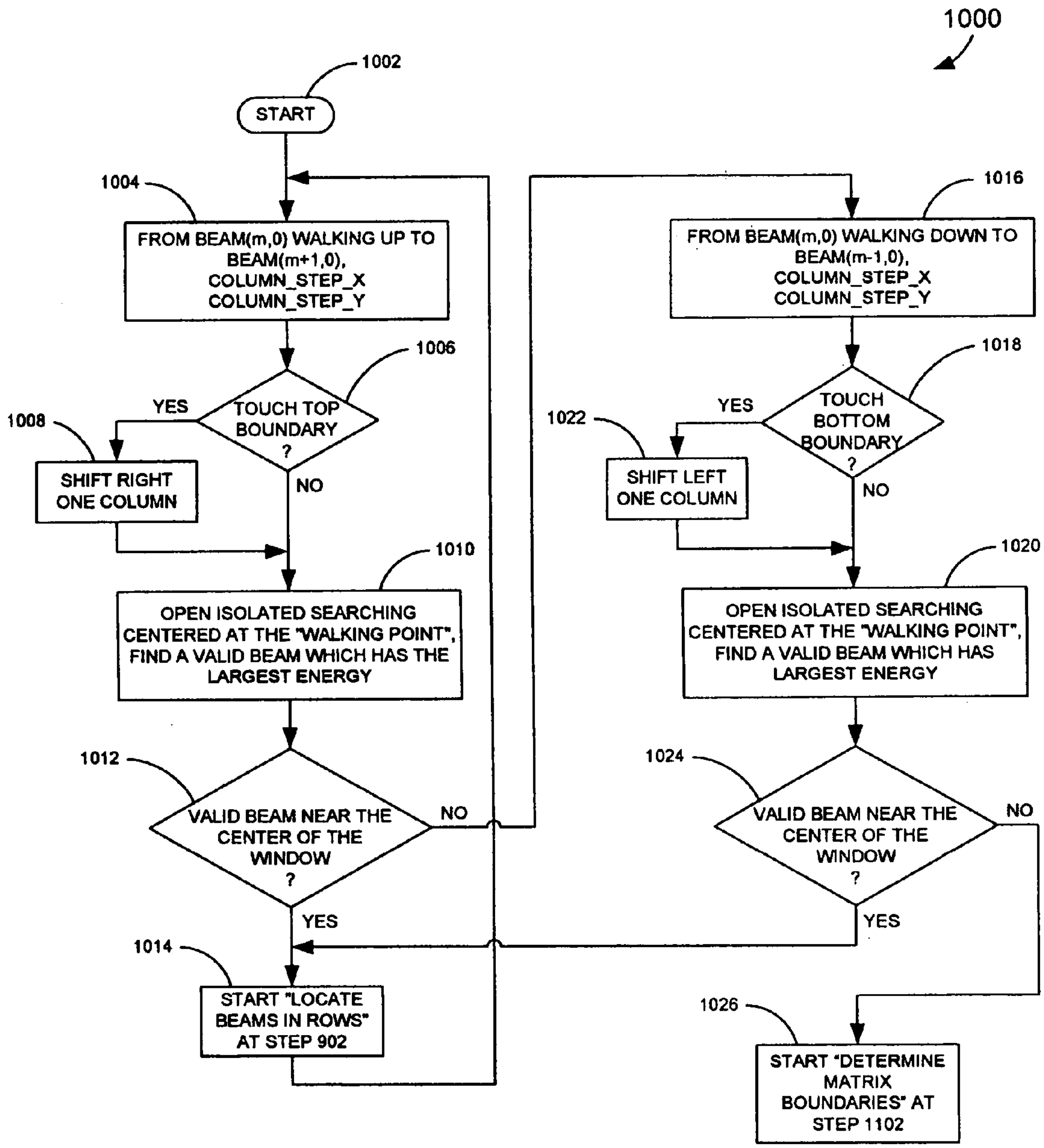
FIG. 9 is a flow diagram depicting a routine for changing to a new row of the beam matrix image.

With reference to FIG. 9, a routine 1000 is illustrated. In step 1002, the routine 1000 is initiated, at which point control transfers to step 1004, where the routine 1000 walks from Beam(m,0) to Beam(m+1,0) using the column_step_x and column_step_y values. Next, in decision step 1006, it is determined whether a top boundary has been touched. If so, control transfers to step 1008, where the routine 1000 shifts right one column. Otherwise, control transfers to step 1010, where an isolated searching window, centered at the walking point, is opened in an attempt to find a valid beam that has the largest energy. Then, in decision step 1012, it is determined whether a valid beam is near the center of the window. If so, control transfers from step 1012 to step 1014, where the process of locating beams in a row is initiated. If a valid beam is not located near the center of the window in step 1012, control transfers to step 1016. In step 1016, the routine 1000 walks from Beam(m,0) to Beam(m−1,0) using the column_step_x and column_step_y values. Next, in decision 1018, it is determined whether a bottom boundary has been reached. If so, control transfers to step 1022, where a one column shift to the left is implemented before transferring control to step 1020. In step 1018, when a bottom boundary has not been reached, control transfers to step 1020, where an isolated searching window, centered at the walking point, is opened in an attempt to find a valid beam that has the largest energy. Next, in decision step 1024, it is determined whether a valid beam is near the center of the search window. If so, control transfers from step 1024 to step 1014. Otherwise, control transfers from decision step 1024 to step 1026, where the determined matrix boundaries process is initiated.

Figure 10:
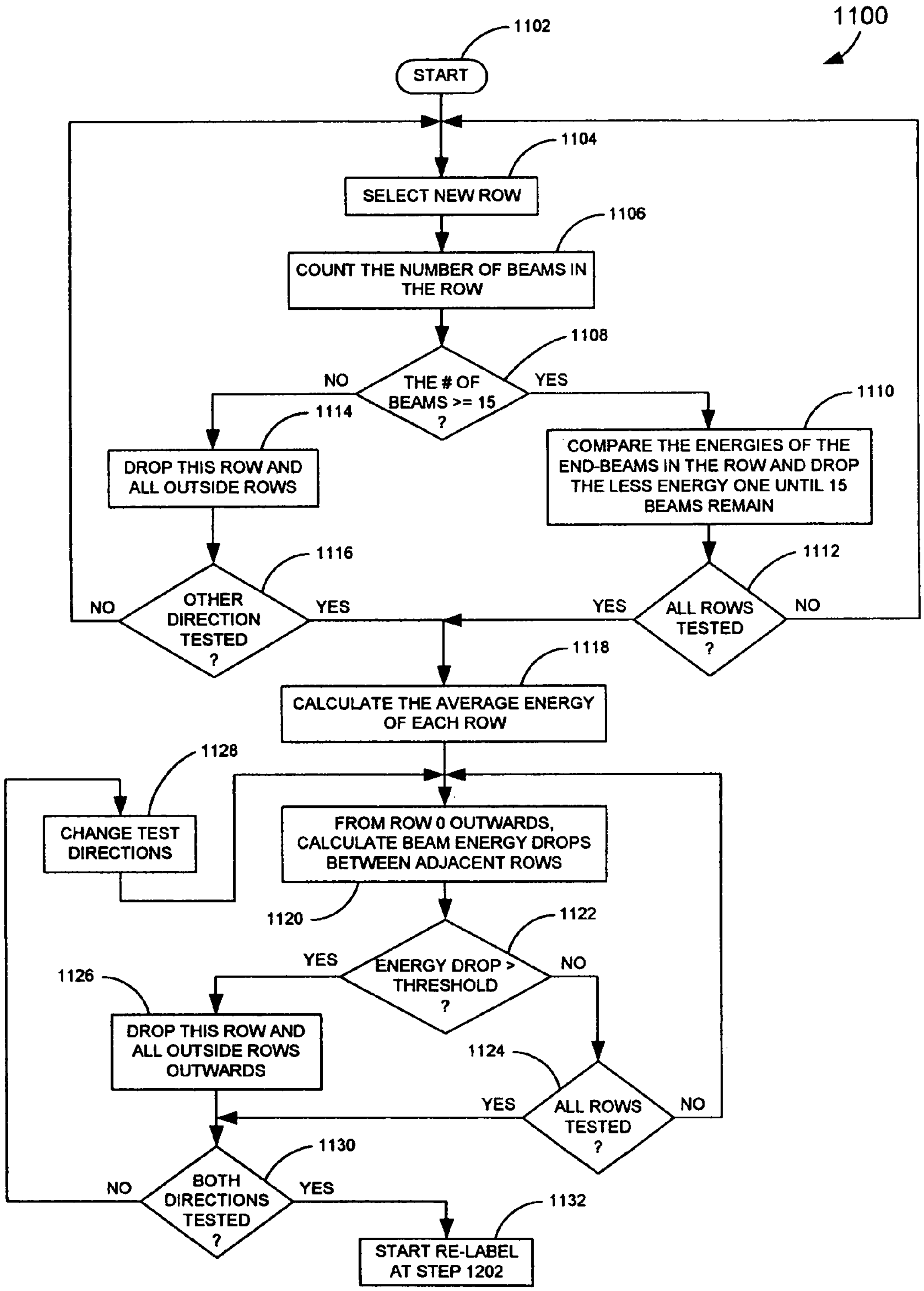
FIG. 10 is a flow diagram depicting a routine for determining boundaries of a beam matrix image.

With reference to FIG. 10, a routine 1100 is depicted that determines the matrix boundaries. In step 1102, the routine 1100 is initiated, at which point control transfers to step 1104, where a new row is selected. Next, in step 1106, the number of beams in a row is counted. Then, in decision step 1108, it is determined if the number of beams is greater than or equal to 15. If so, control transfers to step 1110, where the energies of the end-beams in the row are compared and the beams with the less energy are dropped until 15 beams remain, and then to decision step 1112. In step 1108, if the number of beams is less than or equal to 15, control transfers to step 1114, where the current row and all outside rows are dropped. Next, in decision step 1116, it is determined whether the other direction has been tested. If not, control transfers from step 1116 to step 1104. Otherwise, control transfers from step 1116 to step 1118, where the average energy of each row is calculated. In step 1112, it is determined whether all rows have been tested and, if so, control transfers to step 1118. Otherwise, control transfers from step 1112 to step 1104. From step 1118, control transfers to step 1120, where the beam energy drop between adjacent rows, from row 0 outwards, is calculated. Then, in decision step 1122, it is determined whether the energy drop is greater than a threshold. If so, control transfers to step 1126, where the current row and-all outside rows outwards of the current row are dropped. If the energy drop is not greater than the threshold in decision step 1122, control transfers to decision step 1124, where it is determined whether all rows have been tested. If so, control transfers to decision step 1130. Otherwise, control transfers from step 1124 to step 1120. In step 1130, it is determined whether both directions have been tested from the center of the matrix and, if so, control transfers to step 1132, where the re-label process is initiated. Otherwise, control transfers from step 1130 to step 1128, where the test direction is changed, and then to step 1120.

Figure 11:
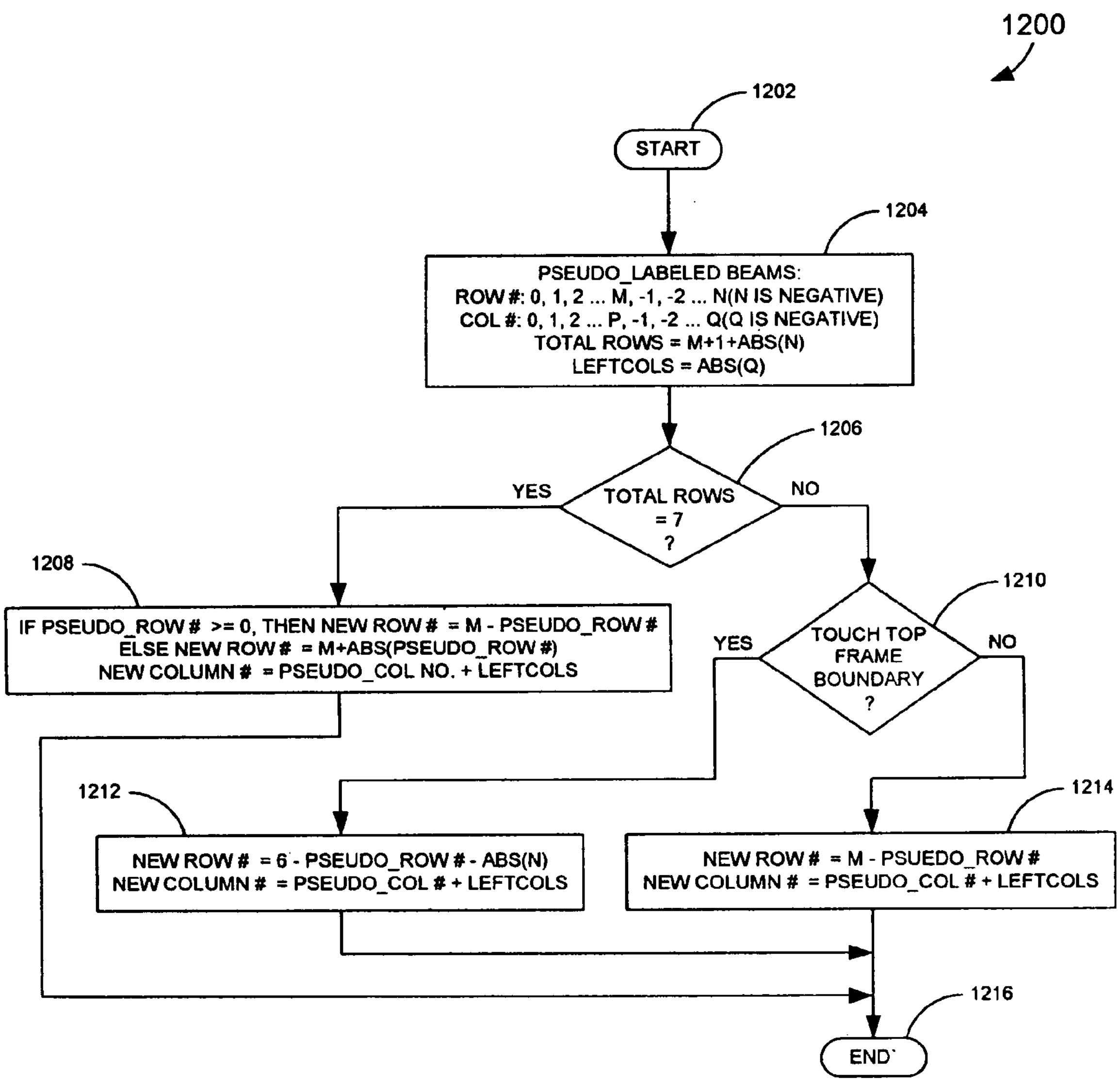
FIG. 11 is a flow diagram depicting a routine for re-labeling the beams of the beam matrix image.

With reference to FIG. 11, a re-labeling routine 1200 is initiated in step 1202, at which point control transfers to step 1204, where the total number of rows that are currently labelled is determined. Next, in decision step 1206, it is determined whether the total number of rows is equal to 7. If so, control transfers to step 1208. Otherwise, control transfers to decision step 1210. In step 1208, re-labeling of the beams is initiated. In decision step 1210, it is determined whether beams touch the top frame boundary of the matrix. If so, control transfers to step 1212, where re-labeling of the beams is initiated. Otherwise, control transfers to step 1214, where re-labeling of the beams is initiated. From steps 1208, 1212 and 1214, control transfers to step 1216, where the routine 1200 terminates.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A method of identifying beam images of a beam matrix, comprising the steps of:

receiving a plurality of light beams of a beam matrix after reflection from a surface of a target, wherein the beam matrix is arranged in rows and columns;

locating a reference light beam in the beam matrix;

locating a row pivot beam in the beam matrix based on the reference beam;

locating remaining reference row beams of a reference row that includes the row pivot beam and the reference beam;

locating a column pivot beam in the beam matrix based on the reference beam;

locating remaining reference column beams of a reference column that includes the column pivot beam and the reference beam; and locating remaining ones of the light beams in the beam matrix.

2. The method of claim 1, wherein the surface of the target has a substantially uniform reflectivity and further including the step of:

directing the plurality of light beams toward the target, wherein the plurality of light beams produce the beam matrix on the surface of the target.

3. The method of claim 1, further including the step of:

determining boundaries of the beam matrix.

4. The method of claim 1, further including the step of:

labeling the beams of the beam matrix with conventional beam labels.

5. The method of claim 1, wherein the surface of the target is substantially planar and has substantially uniform reflectivity.

6. The method of claim 1, wherein the step of locating a reference beam in the beam matrix includes the steps of:

providing an initial search window centered approximated a center of the beam matrix; and locating the reference beam, where the reference beam corresponds to the light beam within the search window whose one-dimensional energy is the greatest.

7. The method of claim 6, wherein the step of locating the reference beam includes the additional steps of:

calculating a center of gravity of the reference beam;

providing an isolated search window centered about the center of gravity of the reference beam; and updating the center of gravity of the reference beam.

8. The method of claim 1, wherein the light beams of the beam matrix are arranged in seven rows and fifteen columns.

9. An object surface characterization system for characterizing a surface of a target, the system comprising:

a light projector;

a camera;

a processor coupled to the light projector and the camera; and a memory subsystem coupled to the processor, the memory subsystem storing code that when executed by the processor instructs the processor to perform the steps of:

directing the light projector to provide a plurality of light beams arranged in a beam matrix of rows and columns, wherein the light beams impinge on the surface of the target and are reflected from the surface of the target;

directing the camera to capture the plurality of light beams of the beam matrix after reflection from the surface of the target;

locating a reference light beam in the captured beam matrix;

locating a row pivot beam in the captured beam matrix based on the reference beam;

locating remaining reference row beams of a reference row that includes the row pivot beam and the reference beam;

locating a column pivot beam in the captured beam matrix based on the reference beam;

locating remaining reference column beams of a reference column that includes the column pivot beam and the reference beam; and locating remaining ones of the light beams in the beam matrix.

10. The system of claim 9, wherein the surface of the target has a substantially uniform reflectivity.

11. The system of claim 9, wherein the memory subsystem stores additional code for causing the processor to perform the additional step of:

determining boundaries of the captured beam matrix.

12. The system of claim 9, wherein the memory subsystem stores additional code for causing the processor to perform the additional step of:

labeling the beams of the beam matrix with conventional beam labels.

13. The system of claim 9, wherein the surface of the target is substantially planar and has substantially uniform reflectivity.

14. The system of claim 9, wherein the step of locating a reference beam in the captured beam matrix includes the steps of:

providing an initial search window centered approximated a center of the captured beam matrix; and locating the reference beam, where the reference beam corresponds to the light beam within the search window whose one-dimensional energy is the greatest.

15. The system of claim 14, wherein the step of locating the reference beam includes the additional steps of:

calculating a center of gravity of the reference beam;

providing an isolated search window centered about the center of gravity of the reference beam; and updating the center of gravity of the reference beam.

16. The system of claim 9, wherein the light beams of the beam matrix are arranged in seven rows and fifteen columns.

17. An object surface characterization system for characterizing a surface of a target, the system comprising:

a light projector;

a camera;

a processor coupled to the light projector and the camera; and a memory subsystem coupled to the processor, the memory subsystem storing code that when executed by the processor instructs the processor to perform the steps of:

directing the light projector to provide a plurality of light beams arranged in a beam matrix of rows and columns, wherein the light beams impinge on the surface of the target and are reflected from the surface of the target;

directing the camera to capture the plurality of light beams of the beam matrix after reflection from the surface of the target;

locating a reference light beam in the captured beam matrix;

locating a row pivot beam in the captured beam matrix based on the reference beam;

locating remaining reference row beams of a reference row that includes the row pivot beam and the reference beam;

locating a column pivot beam in the captured beam matrix based on the reference beam;

locating remaining reference column beams of a reference column that includes the column pivot beam and the reference beam; and locating remaining ones of the light beams in the beam matrix, wherein the surface of the target has a uniform reflectivity.

18. The system of claim 17, wherein the memory subsystem stores additional code for causing the processor to perform the additional step of:

determining boundaries of the captured beam matrix.

19. The system of claim 17, wherein the memory subsystem stores additional code for causing the processor to perform the additional step of:

labeling the beams of the beam matrix with conventional beam labels.

20. The system of claim 17, wherein the step of locating a reference beam in the captured beam matrix includes the steps of:

providing an initial search window centered approximated a center of the captured beam matrix; and locating the reference beam, where the reference beam corresponds to the light beam within the search window whose one-dimensional energy is the greatest.

21. The system of claim 20, wherein the step of locating the reference beam includes the additional steps of:

calculating a center of gravity of the reference beam;

providing an isolated search window centered about the center of gravity of the reference beam; and updating the center of gravity of the reference beam.

* * * * *